(12) United States Patent
Brown et al.

(10) Patent No.: US 8,738,473 B2
(45) Date of Patent: May 27, 2014

(54) INVENTORY FILTERING SYSTEM, METHOD, AND COMPUTER PROGRAM PRODUCT

(75) Inventors: Benjamin Brown, Apollo Beach, FL (US); Michael Cyprian Dabrowski, Louisville, CO (US); David M. Gibson, Spring Grove, VA (US); Henry Ralph Pulley, Hampton, VA (US); Patrice J. Pryor, Columbus, OH (US)

(73) Assignee: Liquidity Services Inc., Washington, DC (US)

( * ) Notice: Subject to any disclaimer, the term of this patent is extended or adjusted under 35 U.S.C. 154(b) by 194 days.

(21) Appl. No.: 12/948,163

(22) Filed: Nov. 17, 2010

(65) Prior Publication Data

US 2011/0071927 A1 Mar. 24, 2011

Related U.S. Application Data

(62) Division of application No. 12/408,388, filed on Mar. 20, 2009.

(60) Provisional application No. 61/064,717, filed on Mar. 21, 2008.

(51) Int. Cl.
*G06Q 10/00* (2012.01)
(52) U.S. Cl.
USPC .............. 705/28; 705/14.24; 705/22; 705/32
(58) Field of Classification Search
None
See application file for complete search history.

(56) References Cited

U.S. PATENT DOCUMENTS

| | | | | | |
|---|---|---|---|---|---|
| 4,568,822 | A | * | 2/1986 | Betzko | 235/78 R |
| 5,536,897 | A | * | 7/1996 | Clark et al. | 588/320 |
| 5,612,507 | A | * | 3/1997 | Clark et al. | 149/60 |
| 5,963,919 | A | * | 10/1999 | Brinkley et al. | 705/28 |
| 6,464,133 | B1 | * | 10/2002 | Gruber | 235/375 |
| 6,739,502 | B2 | * | 5/2004 | Gruber | 235/375 |
| 7,516,890 | B1 | * | 4/2009 | Spremo et al. | 235/385 |
| 7,644,089 | B2 | * | 1/2010 | Stewart et al. | 707/781 |
| 7,707,075 | B2 | * | 4/2010 | Vaughan et al. | 705/28 |
| 2002/0128949 | A1 | * | 9/2002 | Wiesehuegel et al. | 705/37 |
| 2003/0116619 | A1 | * | 6/2003 | Gruber | 235/375 |
| 2005/0143857 | A1 | * | 6/2005 | Chirnomas | 700/244 |
| 2006/0253393 | A1 | * | 11/2006 | Bean et al. | 705/40 |

(Continued)

OTHER PUBLICATIONS

Office Action dated Nov. 24, 2010 from U.S. Appl. No. 12/408,388.

(Continued)

*Primary Examiner* — Fateh Obaid
(74) *Attorney, Agent, or Firm* — Venable LLP; Jeffri A. Kaminski

(57) ABSTRACT

A system, method and computer program product for inventory filtering includes filtering one or more inventory items offered for sale. A primary list of the inventory items from a primary logistics information database may be obtained. A first restriction requirement based on the primary list may be generated. A second list may be generated pertaining to the inventory items and may include a list of one or more internally generated second restriction parameters different than any parameters used to establish the first restriction requirement. A second restriction requirement may be generated based on the second list. A combined restriction requirement may be generated based on any combination of the first restriction requirement and the second restriction requirement. The sale of the item may be restricted based on the combined restriction requirement.

11 Claims, 3 Drawing Sheets

(56) References Cited

U.S. PATENT DOCUMENTS

2007/0084523 A1* 4/2007 McLean et al. ............... 141/231
2009/0307021 A1* 12/2009 Hamilton et al. ................. 705/7
2010/0333031 A1* 12/2010 Castelli et al. ............... 715/835

OTHER PUBLICATIONS

Office Action Dated June 8, 2011 of U.S. Appl. No. 12/408,388, filed Mar. 20, 2009.

* cited by examiner

INVENTORY FILTERING SYSTEM, METHOD, AND COMPUTER PROGRAM PRODUCT

CROSS REFERENCE TO RELATED APPLICATIONS

The present application is a divisional application claiming priority to U.S. application Ser. No. 12/408,388, entitled "Inventory filtering system, method, and computer program product," to Brown et al. filed on Mar. 20, 2009, which claims priority to U.S. Provisional Application Ser. No. 61/064,717, entitled "Inventory filtering system, method, and computer program product," to Brown et al. filed Mar. 21, 2008, the contents of all of which are incorporated herein by reference in their entireties.

BACKGROUND

1. Field

Exemplary embodiments relate generally to inventory filtering and more specifically to filtering restricted items out of an inventory of items.

2. Related Art

A major challenge in the sales industry is the monitoring of products being sold to ensure compliance with regulations. The issue may arise in particular where items are garnered from a third party. A notable such entity is a governmental entity, such as a local, regional or federal entity.

Such third parties may have restrictions regarding the types of products permitted to be sold or otherwise offered for public consumption. For example, in the United States, the Department of Defense provides items for sale by selling entities to the public. Yet, certain items may have to be restricted from sale depending upon the nature of the items and the guidelines provided by the Department of Defense, not to mention internal parameters that may be important for the selling entity.

Currently, there is no viable system that allows the monitoring or restriction of products to ensure compliance with externally cited or internally cited requirements. What is needed is a system and method that allows efficient monitoring and filtering of an inventory of products to determine whether or not restrictions should be applied respecting sales of the products.

SUMMARY OF THE INVENTION

An exemplary system, method and computer program product for inventory filtering is provided. The method may include filtering one or more inventory items offered for sale. In an embodiment, it may include obtaining a primary list of the inventory items from a primary logistics information database; generating a first restriction requirement based on the primary list; generating a second list pertaining to the inventory items comprising a list of one or more internally generated second restriction parameters different than any parameters used to establish the first restriction requirement; generating a second restriction requirement based on the second list; generating a combined restriction requirement based on any combination of the first restriction requirement and the second restriction requirement; and restricting the sale of the item based on the combined restriction requirement.

The above obtaining step may further include obtaining at least one of: a national stock number (NSN) identifying each of the inventory items; and/or a demilitarization code for each of the inventory items, from a federal logistics information (FLIS) database of the United States Departed of Defense. The first restriction requirement may be based on the demilitarization code of the inventory items. Any of the inventory items having a demilitarization code including at least one of A, B and/or Q may be restricted.

The second restriction requirement may be based on an identification criteria pertaining to at least one of: an individual, a group, a region and/or a country associated with one of the inventory items. The second restriction requirement may be provided by a database associated with Defense Reutilization and Marketing Service ("DRMS"). The method may include generating a third list pertaining to the inventory items, including a list of one or more internally generated third restriction parameters different than any parameters used to establish the first restriction requirement and the second restriction requirement, and further based on one or more internal restriction guidelines. Also included may be generating a third restriction requirement based on the third list. The step of generating a combined restriction requirement may further include combining the third restriction requirement with the first restriction requirement and the second restriction requirement.

The third restriction requirement may be based on at least one of: a business oriented interest, an interest in avoiding conflicts, and/or an interest in avoiding bad publicity. The method may include generating a fourth list pertaining to the inventory items comprising a list of one or more internally generated fourth restriction parameters different than any parameters used to establish the first restriction requirement and the second restriction requirement, and further based on one or more internal restriction guidelines; and generating a fourth restriction requirement based on the fourth list, where the step of generating a combined restriction requirement may further include combining the fourth restriction requirement with the first restriction requirement and the second restriction requirement.

The step of generating the fourth list may include comparing an information associated with a said inventory item with a word designation. The word designation may include a buzzword, where the information includes at least one of: a product name, a product description and/or Local Stock Number ("LSN").

In accordance with the embodiments, a system may include an inventory database and an inventory monitoring server coupled to the database. The inventory monitoring server may be operative to: obtain a primary list of inventory items from a primary logistics information database; generate a first restriction requirement based on the primary list; generate a second list pertaining to inventory items comprising a list of one or more internally generated second restriction parameters different than any parameters used to establish the first restriction requirement; generate a second restriction requirement based on the second list; generate a combined restriction requirement based on any combination of the first restriction requirement and the second restriction requirement; and restrict the sale of the item based on the combined restriction requirement.

In an exemplary embodiment, a computer-program product is provided. The program product may have computer-executable instructions which, once executed by a processor, perform a method. The method may include: obtaining a primary list of the inventory items from a primary logistics information database; generating a first restriction requirement based on the primary list; generating a second list pertaining to the inventory items comprising a list of one or more internally generated second restriction parameters different than any parameters used to establish the first restriction requirement; generating a second restriction requirement based on the second list; generating a combined restriction requirement based on any combination of the first restriction requirement and the second restriction requirement; and restricting the sale of the item based on the combined restriction requirement.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF AN EXEMPLARY EMBODIMENT OF THE PRESENT INVENTION

Figure 1:
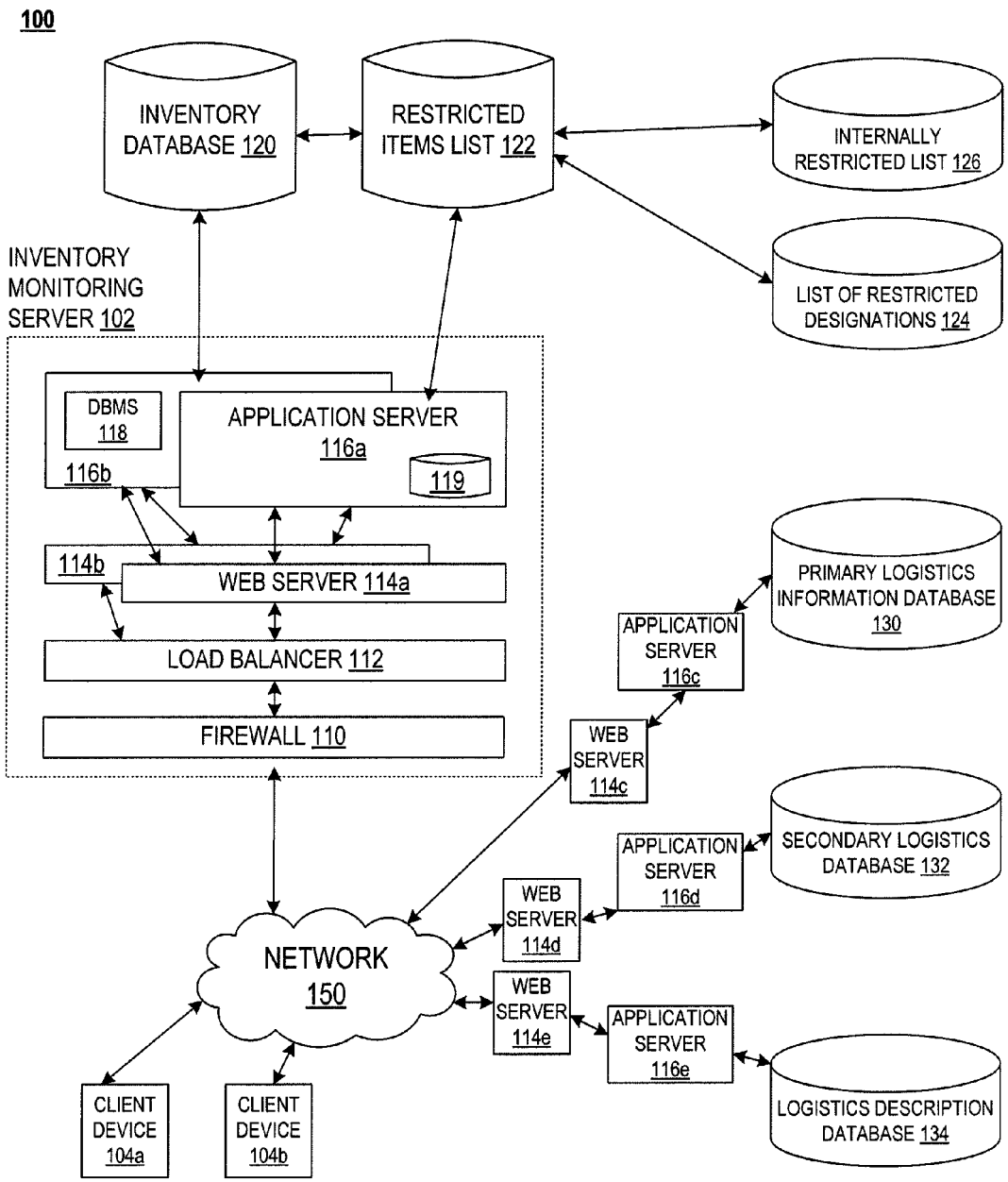
FIG. 1 illustrates an exemplary system 100 for inventory monitoring, according to an exemplary embodiment of the invention.

An exemplary embodiment of the invention is discussed in detail below.

While specific exemplary embodiments are discussed, it should be understood that this is done for illustration purposes only. A person skilled in the relevant art will recognize that other components and configurations can be used without parting from the spirit and scope of the invention.

The term "inventory" as referred to in the present exemplary embodiments may include a list for goods and materials, or those goods and materials themselves, held available in stock by a business. The term "restricted" or "restricted item" may refer to those goods, products, services and/or other materials in the inventory, including any components associated with them, that for example, may not be or should not be sold by the business for a particular or no reason, including, but not limited to, due to military classifications, business conflicts, and the like, and anticipates partial or whole restrictions.

According to an exemplary embodiment of the invention, an online, web-based auction services provider may provide liquidation sales of an inventory of goods, such as, e.g., but not limited to government supplies inventory. In one exemplary embodiment, a liquidation auction services provider site may include, Liquidity Services, Inc. of Washington, D.C. USA.

In one or more exemplary embodiments, the items in the inventory may be designated by a number and/or other designation. The designation may be provided, for example, by an entity, an agency, institution and/or other type of entity. In an exemplary such embodiment, the designation number may be the National Stock Number ("NSN"), a 13-digit numeric code, identifying all the standardized material items of supply as they have been recognized by the United States Department of Defense ("DOD"). Such items may include active and/or inactive items. Pursuant to the NATO Standardization Agreements (STANAGs), the NSN has come to be used in all treaty countries, where it is known as a NATO Stock Number, and such designation is included with the present exemplary embodiments. An item having an NSN in accordance with the present exemplary embodiments may be described as "stock-listed". Any future implementations of such designations, as well as any other designations, may be used as well.

As presently used, the first four digits of the NSN may classify items into logical groupings. The next two digits may indicate the country that assigned the NSN. For example, 00 and 01 may represent the United States. The remaining seven digits may uniquely identify each NSN. In an exemplary embodiment, the NSN may be a central link between a wide range of logistics data which may include, for example: item name, manufacturer(s) part numbers, physical characteristics, shipping data, special handling, storage, shelf-life, disposal requirements, and many other kinds of data. For example, in an exemplary embodiment, the NSN may represent a key that unlocks one or more classes, or all the information about the item to which it has been or shall be assigned.

The DOD may keep the NSNs of any or all items that it has ever bought, used and/or sold in one or more databases identified as the Federal Logistics Information Service ("FLIS"). Currently there are about 6.1 million active items and another 7 million inactive items in FLIS. There are another 8 million active items managed by NATO and the international community. In addition to the NSN for the items, FLIS may include information regarding the item including, but not limited to, the part number, Commercial and Governmental Entity ("CAGE"), National Item Identification Number ("NIIN"), Permanent System Control Number, supplier name, item name, engine number, shipping code, to name a few.

The exemplary embodiments are now described with reference to the accompanying drawings in more particular detail. Referring to FIG. 1, there is described an exemplary system 100 for inventory monitoring, according to an exemplary embodiment of the invention. In the exemplary embodiment as illustrated, the exemplary system 100 may include any number of computer systems and/or network entities, such as local and/or remote processing devices, storage facilities which may function in any particular combination, and/or communications networks between the devices and/or entities. In the exemplary embodiment illustrated, for example, included are inventory monitoring server 102, inventory database 120, restricted items list database 122, internally restricted list database 126, list of restricted designations database 124, primary logistics information database 130, secondary logistics database 132 and logistics description database 134. System 100 also may include an exemplary network 150, which definitionally may include any combination of public and/or private networks. In fact, system 100, including its illustrated and anticipated components, may include any or all of the items set forth below in the exemplary computer system and computer networks embodiments, respectively. For example, the corresponding functions of the foregoing items are not limited to the systems illustrated, and may be implemented as software processes running on in any known platforms located centrally or remotely from one another.

In an exemplary embodiment, inventory management server 102 (also called vault server) may include, for example, application servers 116a, 116b, database management server (DBMS) 118, web servers 114a, 114b, load balancer 112 and/or firewall 110. The application servers 116a, 116b may also include additional storage units 119.

The inventory monitoring server 102 may communicate with any of aforementioned items 120, 122, 124, 126, 130, 132 and/or 134 through any combination of local and/or remote communications, though in the illustrated example, inventory monitoring server 102 may communicate with items 120-124 via a local area network on a bus, while communicating with remotely located items 130-134 via a network 150.

In an exemplary embodiment, the firewall 110 may couple the inventory monitoring server 102 to network 150. Firewall 110 may also provide secure communication between the inventory monitoring server 102 and the network, and may comprise any other firewall processing systems.

Coupled to the firewall 110, in certain embodiments, are one or more load balancer 112. Load balancer 112 may receive requests for data made to the inventory monitoring 102 and distribute these requests among a plurality of web servers 114a, 114b.

The web servers 114a, 114b, together with the application servers 116a, 116b, may process data sent from and/or received by the inventory monitoring server 102. For example, in an embodiment, the web servers 114a, 114b, together with the application servers 116a, 116b may operate an online store selling items to the public through the Internet 150. In an exemplary embodiment, the application servers 116a, 116b may be coupled to the web servers 114a, 114b and provide the back-end application code that creates the web interface, handles listing of products, manages user accounts, creates and manages a user shopping cart, and processes user's purchase of an item via a credit card, among any other tasks. The application servers 116a, 116b may include storage unit 119, which may include the back-end application software.

The application servers 116a, 116b may also include any types of storage devices and/or databases, such as for example DBMS 118 as shown. DBMS 118 may manage storage of information by and retrieval of information from a database coupled to the application servers 116a, 116b. DBMS 118 may include, for example, Oracle, DB2, Microsoft Access, Microsoft SQL Server, Postgres, MySQL and/or FileMaker. In an exemplary embodiment, inventory database 120, restricted items list database 122, internally restricted list database 126 and/or list of restricted designations database 124 comprise separate and/or combined databases comprising DBMS 118, located resident in inventory monitoring server 102 and/or remotely from it in remotely located devices.

For example, one such database may be inventory database 120, which may include a listing of all inventory items. It may also include any information related to such items, such as, for example, but not limited to, price, description, item number, NSN, and the like.

Restricted item list database 122 may include a listing of any and/or all restricted inventory items, and/or any characteristics and/or peripheral data associated with the items. The restricted item list 122 may be any type of information listing, including for example, a simple text file, a spreadsheet, a database file, which may have any type of file format. The information provided in restricted items list database 122 (or for that matter any of the foregoing databases) may or may not be stored therein, but instead may comprise one or more pointers, data-structures, linked lists, and the like.

In an exemplary embodiment, the inventory monitoring server 102 may be coupled, through the network 150, to primary logistics information database 130, which in an exemplary embodiment may be the aforementioned FLIS database 130. As previously discussed, the FLIS database 130 may include information including, but not limited to, the NSNs of millions of items that are currently used, or have ever been used, by the DOD. The FLIS database 130 may also include information relating to the demilitarization code of each respective item. The demilitarization code may be assigned by the DOD as a part of the Demilitarization Program, which is designed to provide worldwide management and/or disposition of the vast and growing array of material no longer needed by the military services. In an exemplary embodiment, using the demilitarization code, it may be determined whether an item can or cannot be sold to the public. Table 1 below provides a listing of various demilitarization codes.

TABLE 1

| Code | Description |
| --- | --- |
| A | DML not required |
| B | DML not required. Trade Security Controls (TSCs) required at disposition. |
| C | Remove and/or demilitarize installed key point(s) as prescribed in the Defense Demilitarization Manual, or lethal parts, components and accessories. |
| D | Total destruction of the item and components so as to preclude restoration or repair to a usable condition by melting, cutting, tearing, scratching, crushing, breaking, punching, neutralizing, etc. (As an alternate, burial or deep water dumping may be used when coordinated with the DoD Demilitarization Program Office.) |
| E | Additional critical items/material determined to require demilitarization, either key point or total destruction. Demilitarization instructions to be furnished by the DOD Demilitarization Program Office. |
| F | Demilitarization Instructions to be furnished by the Item/Technical Manager. |
| G | Demilitarization required. Ammunition, explosives, and dangerous articles (AEDA). Demilitarization, and if required, declassification and/or removal of sensitive markings or information, will be accomplished. This code will be used for all AEDA items, including those which also require declassification and/or removal of sensitive markings or information. |
| P | Security classified item-Declassification and any additional demilitarization and removal of any sensitive markings or information will be accomplished prior to accountability or physical transfer to a DRMO. This code will not be assigned to AEDA items. |
| Q | Strategic List Item (SLI). Demilitarization not required. SLI are non-MLI(Munitions List Items) controlled by the U.S. Dept. of Commerce through the Export Administration Regulations (EAR) and on indicated the Commerce Control List (CCL). Each CCL entry is preceded by a four-digit Export Control Classification Number (ECCN) and those ECCNs ending in the letter "A" or "B" are defined as Strategic List Items. These items are subject to Import Certification and Delivery Verification (IC/DV) control and other trade security controls. |

In an exemplary embodiment, the inventory monitoring server 102 may be configured to consider all items with a demilitarization code other than A, B and Q as restricted items that should not be sold to the public. Thus, in an exemplary embodiment, the inventory monitoring server 102 may make a query to FLIS database 130 for all items having a demilitarization code other than A, B and Q in order to obtain a list of all restricted items. In an exemplary embodiment, this may be done via a gateway provided to the inventory monitoring server 102 by the FLIS database 130. According to an exemplary embodiment, the FLIS database 130 may be coupled to the inventory monitoring server 102 via a web server 114c and an application server 116c.

In a further embodiment of the invention, in addition to the FLIS database 130, the inventory monitoring server 102 may use, for example, secondary logistics database 132 that may include a listing of items that should be restricted, even though they do not have a demilitarization code of A, B or Q. According to an exemplary embodiment, the secondary logistics database 132 may be coupled to the inventory monitoring server 102 via a web server 114*d* and an application server 116*d*. An example of such secondary logistics database 132 is a database provided by the Defense Reutilization and Marketing Service ("DRMS"), which is a sub-agency of the DOD assigned to manage and sell original DOD surplus property. An example of items that may be included in the secondary logistics database 132 include item parts of a particular aircraft. In this example, the particular aircraft parts may have a demilitarization code of A, B or Q, so would not be restricted based on their demilitarization code. However, the only other place outside of the United States where such aircraft are used may be by individuals, groups, regions and/or countries to which it would be preferable not to sell the parts. Thus, the DOD and/or other entity, agency and/or institution involved may wish to restrict the sale of such parts in order to prevent the parts from making their way to the foregoing parties.

In a yet further embodiment, items may be restricted with reasons unrelated to reasons for which the entity, agency and/or institution involved with, keeping, maintaining, or otherwise exerting control and/or criteria over logistics databases 130-134 desires to make restrictions. In an exemplary embodiment, restrictions may be made for business purposes, to avoid conflicts and/or to avoid bad publicity in the court of public opinion. Such restrictions may be made independently, or in combination with, the restrictions provided by databases 130-134.

In an exemplary such embodiment, an internally restricted list database 126 stores items that are restricted for such secondary reasons. As an example, there may be no restriction on the sale of an angle iron or a tube that could be used with a rocket launcher, but doing so may create bad publicity, in which case it would make no business sense to sell such item. Thus, the internally restricted list 126 may be provided to restrict such items from being sold to the public.

In yet another embodiment, items may be restricted with one or more tertiary criteria based on a list of restricted designations database 124, which may be made independently, or in combination with, the foregoing restrictions, namely as provided by restricted items list database 122, databases 130-134 and/or internally restricted list database 126. An example of such criteria are words, phrases and/or other designations particular to an item, and/or groups or classes of items, and/or other designations associated with items, such as specialized fields, customary language and/or technical designations and the like. An exemplary such designation is a descriptive word associated with an item, such as a buzzword.

Such designations may cause the item to be flagged for restriction. For the example of a word designation, the item may be flagged if the description of the item contains the word designation. Alternative criteria may also be established for determining whether the flagging causes a tertiary restriction. In an exemplary embodiment, for example, parsing is performed on the flagged word designations and the other words appearing in the item description to determine whether the context should yield a restriction. For example, the word "gun" or "rocket" may be included in the restricted designations, so that any item that includes these words would be flagged. However, if the word "pain" also appears with the word "gun" in the description, then the item may be removed from restriction status, such as by removing the flagging designation and/or the restriction designation.

In yet another exemplary embodiment, the restricted designations may be used as a catch-all mechanism for one or more other item that were not restricted using the lists described above. For example, if there is a particular item that was inadvertently assigned an incorrect demilitarization code, or if the item's NSN is incorrect and thus the item is not identified as restricted based on FLIS 130 and/or the secondary logistics information database 132, the restricted designations database 124 may provide a chance to filter the item out of the inventory before the item is sold, either publicly or privately.

In addition, some items may not have primary logistics information and/or other designations, and the restricted designations database 124 may be useful for such items. For example, an item may not have an NSN associated with it. The DOD may purchase such an item from the public without issuing an NSN and later sell the item as a part of DOD surplus. Also, in some cases the primary designation may be missing. For example, it is possible that the NSN associated with an item is missing. If a document accompanying an item is missing, the NSN may not be readily available without going through the DOD's past inventory records. In such cases, the item may be assigned a Local Stock Number ("LSN") or other designation by, for example, a property specialist and/or automated processing system. The property specialist may be able to identify the item and the classification the item belongs to and accordingly make up an LSN that comprises a series of digits, for example, four digits, corresponding to the classification of the item, and a brief description, for example, item name. Thus, the LSN may not be identifiable in an automated fashion using FLIS 130 or secondary logistics information database 132. Accordingly, the restricted designations database 124 may be used to identify items with missing primary logistics information and/or other designations, such as NSNs, as restricted according to the item's description.

In an exemplary embodiment, if an item description includes a word designation from the list of restricted designations database 124, the item may be flagged for further examination. In an exemplary embodiment, a technician and/or automated processing system may examine the flagged items in order to determine whether they should be restricted. Alternatively, an item flagged according to the list of restricted designations database 124 may automatically become restricted. In a further embodiment, however, there may be different types of flags associated with each such designation, such that appearance of certain designations in the description of an item may create a flag that automatically restricts the item, whereas other word designations may create a different flag that would require a technician and/or automated processing system to examine the items.

When searching for word descriptions in the item description, it may occur that an item either lacks a product description altogether or does not include a sufficient description to identify the product. Thus, according to an exemplary embodiment of the invention, there may be provided a logistics description database 134 that may provide one or more product descriptions for the item. In an exemplary embodiment, it is a comprehensive product description for all items.

In an exemplary embodiment, the product description may correspond to a primary description. For example, the product description may correspond to an NSN, so that the logistics description database 134 may be queried using the NSN of the item that needs a product description. An example of such logistics description database 134 may include, for example, but not limited to, HAYSTACK® of IHS, Inc. According to an exemplary embodiment, the logistics description database 134 may be coupled to the inventory monitoring server 102 via a web server 114*e* and an application server 116*e*.

In an exemplary embodiment, if a product description is retrieved from the logistics description database 134, the description may be stored in a local database, for example, but not limited to, the inventory database 120, so that the description is available in the future. In an exemplary embodiment, the product description is then searched for any word designations that may cause the item to be flagged, as described above.

According to an exemplary embodiment, one or more client devices 104a and 104b (collectively hereinafter 104) may couple to a inventory monitoring system 102 using a network 150. In an exemplary embodiment, a user may utilize a client device 104 to connect to an inventory monitoring server 102 and buy and/or bid on products. According to an exemplary embodiment, a client device 104 may display a web interface provided by an inventory monitoring system 102, receive user information, and provide user information to the inventory monitoring system 102. In an exemplary embodiment, a client device 104 may be a computer, such as, e.g., but not limited to, a personal computer.

Figure 2:
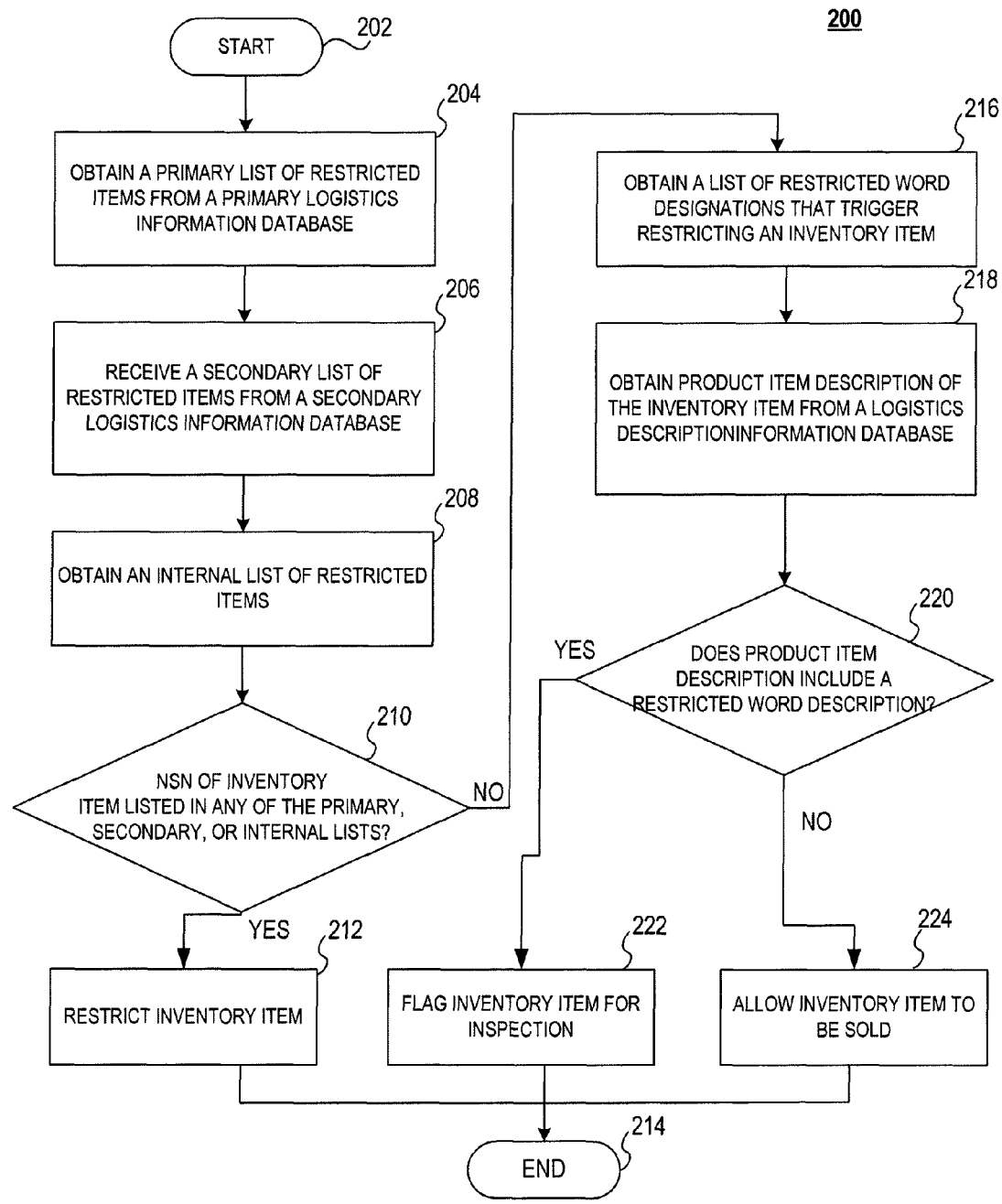
FIG. 2 illustrates an exemplary flow diagram of an inventory monitoring process 200 according to an exemplary embodiment of the invention.

FIG. 2 illustrates an exemplary flow diagram of an inventory monitoring process 200 according to an exemplary embodiment. The illustrated and hereafter described exemplary embodiment refers to a specific implementation, as above used to facilitate an understanding of system 100, though it must be recognized the specific implementation is for illustration purposes only, and in no way to be considered as limiting to the embodiments described herein.

In the illustrated exemplary embodiment, the inventory filtering process 200 is described in accordance with system 100 of FIG. 1. Beginning with start step 202, control is immediately passed to step 204.

In step 204, the system may receive a list of items from a primary logistics information database such as, for example, but not limited to, FLIS. As previously explained, FLIS may include a listing of millions of items used by the DOD, for example. Thus, in an exemplary embodiment, the list of restricted items may be obtained by making a query of all items having restricted demilitarization codes such as, for example, but not limited to, A, B or Q demilitarization codes. In the illustrated embodiment, the list of items may include NSNs as well as the description of the restricted items.

In step 202, a secondary list of restricted items from a secondary logistics information database may be obtained. An example of such secondary logistics information database may be provided by the above-noted DRMS.

In step 208, an internal list of restricted items may be obtained. As previously described, such list may include items that have been restricted for internal purposes, for example, but not limited to, to avoid business conflicts and negative media attention.

In step 210, it may be determined whether any of the inventory items have an NSN that is listed in any of the primary, secondary, or internal lists of restricted items. If so, in step 212 the inventory items that have such NSNs may thus be restricted and prevented from being sold. Here, the restricted items may be removed from the lot and returned to the agency in control, such as, for example, the DOD or the DRMS. Control may pass thereafter to end in step 214.

On the other hand, if the answer to step 212 is not affirmative, control may pass to step 216. In step 216, a list of restricted designations may be used for restrictions. For example, using the list of word designations, a search may be performed in the item's name, description, and/or, if applicable, the LSN, to determine if one of the word designations can be located.

If the product does not include a sufficient description, in step 218 a sufficient description of the product may be obtained from a logistics description information database. As noted, the logistics description information database may, for example, be provided through a third party provider. In an exemplary embodiment, the description may be inquired about any item for which a description is needed. Alternatively, the product description of all inventory items may be acquired.

In step 220, the logistics description information database before the list of word designations may used to search the product name, description, and/or LSN (if applicable) for such word designations to identify items that may potentially be restricted. If such items are found, in step 222, the item may be restricted or flagged for further inspection. Otherwise, in step 224, the item may be allowed to remain in the inventory. The process 200 may then end at 214.

According to an exemplary embodiment of the invention, the lists of restricted items may be obtained from the primary and/or secondary logistics information databases on periodic basis, for example, but not limited to, monthly, weekly, nightly, etc. Also, according to an exemplary embodiment, inventory list may be checked against the various lists of restricted items and/or the list of word designations as described above periodically, for example, monthly, weekly, nightly, etc. In an exemplary embodiment, one such check may be performed when new items are received to be added to the inventory. Accordingly, in an exemplary embodiment, data records corresponding to the received items may be checked against the lists of restricted items to identify items that should be restricted. In an exemplary embodiment, the restricted items may then be removed from the inventory. In an exemplary embodiment, the new items may also be checked against the list of word designations to flag potentially restricted items. Such items may then be manually reviewed and removed if it is determined that such items should be restricted.

In an exemplary embodiment, all inventory items may additionally be checked periodically, for example, daily, weekly, etc., against the described lists of restricted items and/or the list of word designations. In an exemplary embodiment, such checks may also be performed during item lotting. Finally, in an exemplary embodiment, such checks may be performed one last time before customer invoicing and payment collection, to ensure that no restricted items are being sold to the public.

Exemplary Computer System Embodiment

Figure 3:
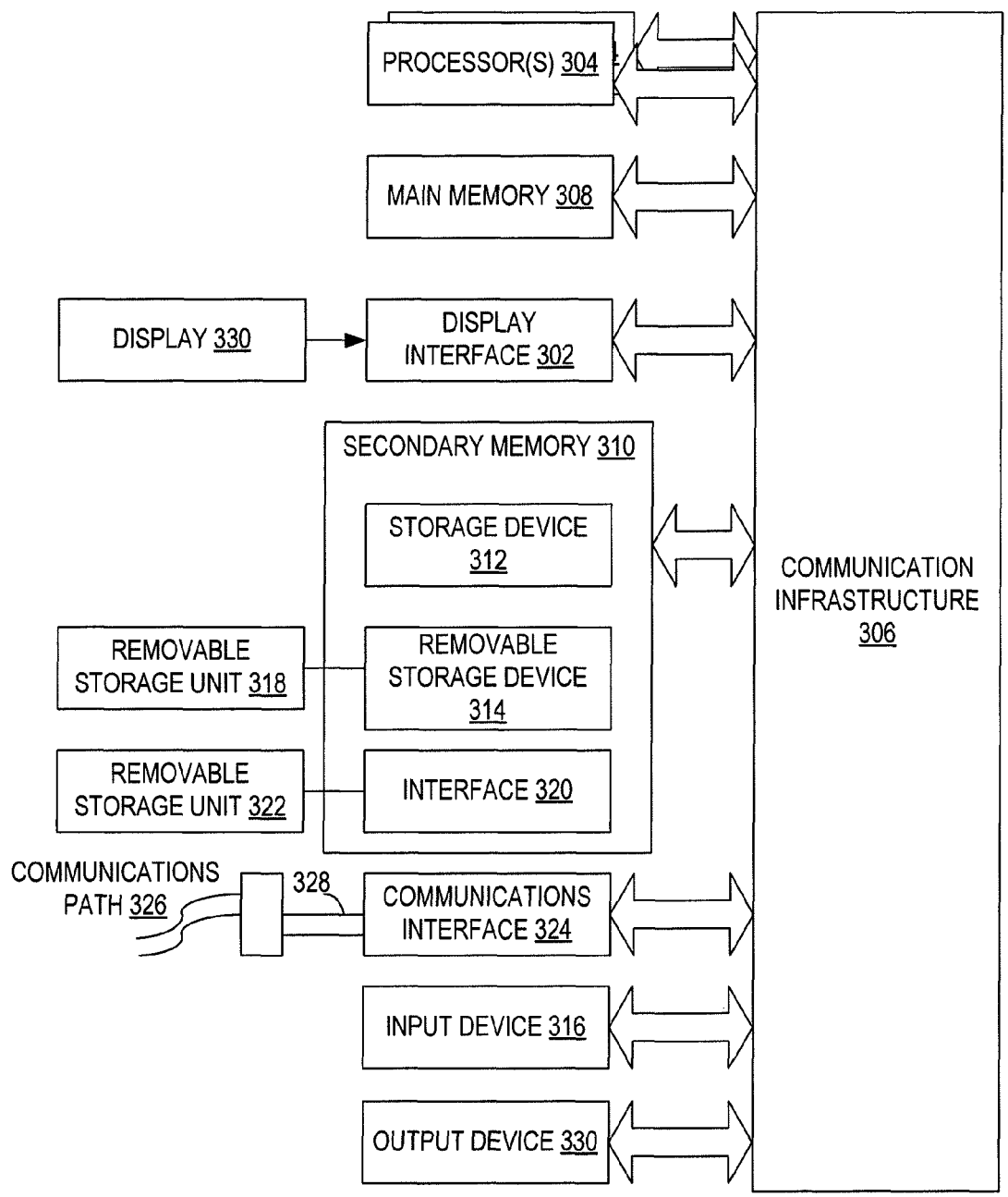
FIG. 3 depicts an exemplary computer system embodiment that may be used in implementing one or more of the system components of various exemplary embodiments of the present invention.

FIG. 3 depicts an exemplary computer system that may be used in implementing one or more exemplary embodiments of the present invention. Specifically, FIG. 3 depicts an exemplary embodiment of a computer system 300 that may be used in computing devices such as, for example, but not limited to, a client and/or a server, etc., according to an exemplary embodiment of the present invention. FIG. 3 depicts an exemplary embodiment of a computer system that may be used as client device 300, or a server device 300, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 may be shown in FIG. 3, depicting an exemplary embodiment of a block diagram of an exemplary computer system useful for implementing the present invention. Specifically, FIG. 3 illustrates an example computer 300, which in an exemplary embodiment may be, for example, (but not limited to) a personal computer (PC) system running an operating system such as, for example, (but not limited to) MICROSOFT® WINDOWS® NT/98/2000/XP/CE/ME/VISTA/etc. available from MICROSOFT® Corporation of Redmond, Wash., U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 300 may be shown in FIG. 3. Other components of the invention, such as, for example, (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 3. Services may be provided on demand using, for example, but not limited to, an interactive television (iTV), a video on demand system (VOD), and via a digital video recorder (DVR), or other on demand viewing system.

The computer system 300 may include one or more processors, such as, for example, but not limited to, processor(s) 304. The processor(s) 304 may be connected to a communication infrastructure 306 (for example, but not limited to, a communications bus, cross-over bar, or network, etc.). Various exemplary software embodiments may be described in terms of this exemplary computer system. After reading this description, it may become apparent to a person skilled in the relevant art(s) how to implement the invention using other computer systems and/or architectures.

Computer system 300 may include a display interface 302 that may forward, for example, but not limited to, graphics, text, and other data, etc., from the communication infrastructure 306 (or from a frame buffer, etc., not shown) for display on the display unit 330.

The computer system 300 may also include, for example, but may not be limited to, a main memory 308, such as, for example, but not limited to, a random access memory (RAM), and a secondary memory 310, etc. The secondary memory 310 may include, for example, (but not limited to) a hard disk drive 312 and/or a removable storage drive 314, representing a floppy diskette drive, a magnetic tape drive, an optical disk drive, a compact disk drive CD-ROM, etc. The removable storage drive 314 may, for example, but not limited to, read from and/or write to a removable storage unit 318 in a well known manner. Removable storage unit 318, also called a program storage device or a computer program product, may represent, for example, but not limited to, a floppy disk, magnetic tape, optical disk, compact disk, etc. which may be read from and written to by removable storage drive 314. As may be appreciated, the removable storage unit 318 may include a computer usable storage medium having stored therein computer software and/or data. In some embodiments, a "machine-accessible medium" may refer to any storage device used for storing data accessible by a computer. Examples of a machine-accessible medium may include, for example, but not limited to: a magnetic hard disk; a floppy disk; an optical disk, like a compact disk read-only memory (CD-ROM) or a digital versatile disk (DVD); a magnetic tape; and a memory chip, etc.

In alternative exemplary embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as, for example, but not limited to, those found in video game devices), a removable memory chip (such as, for example, but not limited to, an erasable programmable read only memory (EPROM), or programmable read only memory (PROM) and associated socket, and other removable storage units 322 and interfaces 320, which may allow software and data to be transferred from the removable storage unit 322 to computer system 300.

Computer 300 may also include an input device 316 such as, for example, (but not limited to) a mouse or other pointing device such as a digitizer, and a keyboard or other data entry device.

Computer 300 may also include an output device such as, for example, (but not limited to) display 330, and display interface 302. The computer 300 may also include other output devices 330 such as, for example, but not limited to, a printer.

Computer 300 may include other input/output (I/O) devices such as, for example, (but not limited to) communications interface 324, cable 328 and communications path 326, etc. These devices may include, for example, but not limited to, a network interface card, and modems (neither are labeled). Communications interface 324 may allow software and data to be transferred between computer system 300 and external devices.

In this document, the terms "computer program medium" and "computer readable medium" may be used to generally refer to media such as, for example, but not limited to removable storage drive 314, a hard disk installed in hard disk drive 312, and signals 328, etc. These computer program products may provide software to computer system 300. The invention may be directed to such computer program products.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Exemplary Computer Networks Embodiment

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. The distinction between hardware and software may not be easily defined, with the same or similar functions capable of being preformed with use of either, or alternatives.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

In an exemplary embodiment, the processes may communicate with one another through interprocess communication pathways (not labeled) supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless e-mail devices including Black-Berry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1xRTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

As noted, each node includes one or more processes, executable by processors incorporated into the nodes. In a number of embodiments, the set of processes, separately or individually, can represent entities in the real world, defined by the purpose for which the invention is used.

Furthermore, the processes and processors need not be located at the same physical locations. In other words, each processor can be executed at one or more geographically distant processor, over for example, a LAN or WAN connection. A great range of possibilities for practicing the embodiments may be employed, using different networking hardware and software configurations from the ones above mentioned.

Conclusion

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device. In yet another exemplary embodiment, the invention may be implemented using a combination of any of, for example, but not limited to, hardware, firmware and software, etc.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Finally, while various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An inventory filtering method comprising:
   obtaining, using application server hardware, a primary list of restricted items from a primary logistics information database;
   restricting, using the application server hardware, the sale of a first inventory item based on the primary list of restricted items wherein the primary list of restricted items comprises a plurality of items each having a restrictive demilitarization code;
   retrieving, using the application server hardware, a product item description of a second inventory item from a second logistics description database;
   providing a plurality of different flag types;
   retrieving, using the application server hardware, a predetermined word designation that is associated with one of the plurality of flag types;
   determining, using the application server hardware, the product item description of the second inventory item includes the retrieved predetermined word designation;
   flagging, using the application server hardware, the second inventory item according to the flag type associated with the predetermined word designation based on the determination the product item description of the second inventory item includes the predetermined word designation;
   parsing the product item description of the second inventory item based on the flag type to determine a context of words in the predetermined word designation;
   determining if the flag on the second inventory item from the flagging step should be removed based on the parsing;
   restricting, using the application server hardware, the sale of the second inventory item based on the flagging.

2. The method of claim 1, wherein each of the plurality of items is designated by a National Stock Number (NSN).

3. The method of claim 1, wherein each of the restrictive demilitarization codes comprises any one of: a demilitarization code of A, B or Q.

4. The inventory filtering method of claim 1, wherein the step of restricting the sale of the first inventory item comprises:
   comparing a National Stock Number (NSN) of the first inventory item with an NSN of at least one item from the primary list of restricted items.

5. The method of claim 1, wherein the primary logistics information database comprises a database associated with Federal Logistics Information Service ("FLIS").

6. The method of claim 1, further comprising:
   obtaining a secondary list of restricted items from a second logistics information database; and
   restricting the sale of a third inventory item based on the secondary list of restricted items.

7. The method of claim 6, wherein said secondary list of restricted items comprises a plurality of restricted items having a non-restrictive demilitarization code.

8. The method of claim 6, wherein the second logistics information database comprises a database associated with Defense Reutilization and Marketing Service ("DRMS").

9. The inventory filtering method of claim 6, wherein the step of restricting the sale of the third inventory item comprises:
   comparing a National Stock Number (NSN) of the third inventory item with an NSN of at least one item from the secondary list of restricted items.

10. The inventory filtering method of claim 1, further comprising:
    constructing an internal list of restricted items; and
    restricting a third inventory item based on the internal list of restricted items.

11. The inventory filtering method of claim 10, wherein the internal list of restricted items comprises items restricted for at least one of a business oriented interest, an interest in avoiding conflicts, or an interest in avoiding bad publicity.

* * * * *